US010429726B2

(12) United States Patent
Suzuki et al.

(10) Patent No.: US 10,429,726 B2
(45) Date of Patent: Oct. 1, 2019

(54) IMAGE DISPLAY APPARATUS AND IMAGE DISPLAY METHOD

(71) Applicant: SONY CORPORATION, Tokyo (JP)

(72) Inventors: Chiharu Suzuki, Kanagawa (JP); Yukihiro Sasazaki, Tokyo (JP); Naoya Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/750,719

(22) PCT Filed: Jun. 20, 2016

(86) PCT No.: PCT/JP2016/002952
§ 371 (c)(1),
(2) Date: Feb. 6, 2018

(87) PCT Pub. No.: WO2017/033369
PCT Pub. Date: Mar. 2, 2017

(65) Prior Publication Data
US 2019/0004410 A1    Jan. 3, 2019

(30) Foreign Application Priority Data
Aug. 24, 2015   (JP) .................................. 2015-164890

(51) Int. Cl.
*G03B 21/20*       (2006.01)
*G09G 3/02*        (2006.01)
(Continued)

(52) U.S. Cl.
CPC ....... *G03B 21/2053* (2013.01); *G03B 21/204* (2013.01); *G09G 3/02* (2013.01);
(Continued)

(58) Field of Classification Search
CPC ..................... G03B 21/204; G03B 21/206; G03B 21/2013; G03B 21/2053; G03B 21/2066
See application file for complete search history.

(56) References Cited

U.S. PATENT DOCUMENTS

2008/0187012 A1*  8/2008  Yamauchi ............. G03B 33/12
                                                         372/26
2012/0038694 A1   2/2012  Nakanishi et al.
(Continued)

FOREIGN PATENT DOCUMENTS

| EP | 2413309 A1 | 2/2012 |
| JP | 2012-109989 A | 6/2012 |
| JP | 2012-137509 A | 7/2012 |
| JP | 2014-106420 A | 6/2014 |
| JP | 2015-072387 A | 4/2015 |

OTHER PUBLICATIONS

International Search Report and Written Opinion of PCT Application No. PCT/JP2016/002952, dated Aug. 23, 2016, 10 pages.

*Primary Examiner* — Sultan Chowdhury
(74) *Attorney, Agent, or Firm* — Chip Law Group

(57) ABSTRACT

An image display apparatus according to an embodiment of the present technology includes a first light source module, a second light source module, an output control unit, and an image generation unit. The first light source module emits a first laser light. The second light source module includes a light source unit that emits a second laser light and a phosphor layer that emits visible light by excitation by the second laser light. The output control unit controls outputs of the first laser light and the second laser light on a basis of an average and a dispersion of luminance values in pixels of an input image. The image generation unit generates an image on a basis of the first laser light emitted from the first light source module and the visible light emitted from the second light source module.

15 Claims, 14 Drawing Sheets

(51) Int. Cl.
  *G09G 3/20* (2006.01)
  *G09G 3/34* (2006.01)
  *H04N 9/31* (2006.01)
  *G03B 21/00* (2006.01)
  *G03B 33/12* (2006.01)

(52) U.S. Cl.
  CPC ............... *G09G 3/20* (2013.01); *G09G 3/34* (2013.01); *G09G 3/3406* (2013.01); *H04N 9/3155* (2013.01); *H04N 9/3158* (2013.01); *H04N 9/3161* (2013.01); *H04N 9/3182* (2013.01); *G03B 21/006* (2013.01); *G03B 33/12* (2013.01)

(56) References Cited

U.S. PATENT DOCUMENTS

| | | | |
|---|---|---|---|
| 2013/0070208 A1* | 3/2013 | Nakanishi | G03B 21/16 353/31 |
| 2013/0250255 A1* | 9/2013 | Kurosaki | F21V 13/08 353/85 |
| 2014/0146092 A1 | 5/2014 | Toyooka | |
| 2014/0192331 A1 | 7/2014 | Toyooka | |
| 2015/0002824 A1* | 1/2015 | Kasugai | G03B 21/204 353/31 |
| 2015/0204517 A1* | 7/2015 | Arakawa | G03B 21/204 353/84 |

\* cited by examiner

| x | YHIST[x] | WT[x] | YHIST[x]*WT[x] |
|---|---|---|---|
| 0 | 0 | 0 | 0 |
| 1 | 10 | 1 | 10 |
| 2 | 50 | 2 | 100 |
| 3 | 60 | 3 | 180 |
| 4 | 50 | 4 | 200 |
| 5 | 40 | 5 | 200 |
| 6 | 30 | 6 | 180 |
| 7 | 10 | 7 | 70 |

FIG. 10A

| $\Sigma$ (YHIST[x]*WT[x]) | 830 |
|---|---|
| $\Sigma$ (YHIST[x]) | 250 |
| max(WT[x]) | 7 |
| APL_raw | 3.8 |
| Normalized APL | 0.5 |

FIG. 10B

| YHIST[x]*(WT[x]/max(WT[x])-APL)$^2$ |
|---|
| 0 |
| 1.554612245 |
| 3.160816327 |
| 0.707265306 |
| 0.05877551 |
| 1.255183673 |
| 3.072 |
| 2.142367347 |

FIG. 10C

| $\Sigma$ (YHIST[x]*(WT[x]/max(WT[x])-APL)$^2$) | 11.95102 |
|---|---|
| VAL_raw | 0.047804 |

FIG. 10D

| coef_a | -1 |
|---|---|
| coef_b | 0.25 |
| coef_c | 0.5 |
| Normalized VAL | 0.2 |

IMAGE DISPLAY APPARATUS AND IMAGE DISPLAY METHOD

CROSS REFERENCE TO RELATED APPLICATIONS

This application is a U.S. National Phase of International Patent Application No. PCT/JP2016/002952 filed on Jun. 20, 2016, which claims priority benefit of Japanese Patent Application No. JP 2015-164890 filed in the Japan Patent Office on Aug. 24, 2015. Each of the above-referenced applications is hereby incorporated herein by reference in its entirety.

TECHNICAL FIELD

The present technology relates to an image display apparatus such as a projector, an image display method, and a program.

BACKGROUND ART

From the past, image display apparatuses such as projectors are being widely used. For example, light from a light source is modulated by a light modulation element such as a liquid crystal element, and modulated light is projected on a screen or the like, thereby displaying an image. As the light source, a mercury lamp, a xenon lamp, an LED (Light Emitting Diode), an LD (Laser Diode), or the like is used. Out of those, a solid light source such as an LED and an LD has advantages in terms of a long lifetime that can save a lamp exchange unlike before and instantaneous lighting when a power is turned on.

Patent Literature 1 describes, as shown in FIG. 1 thereof, a projector including a mercury lamp and a mirror device capable of selectively reflecting light from the mercury lamp in two directions. In the projector, on a basis of a luminance distribution of image signals and an image average luminance thereof, an operation of the mirror device is controlled, and a light quantity of light with which a light modulation apparatus for each of RGB is irradiated is controlled. Specifically, in a case where an input gradation of the light modulation apparatus is low, and a pixel difficult to reproduce a color exists, the quantity of light with which the light modulation apparatus is irradiated is reduced. Meanwhile, the input gradation of the light modulation apparatus is changed to be such a high gradation value that color reproduction can be appropriately performed. As a result, even in a case of a black image or an image with a low luminance, it is possible to obtain a projection image with good color reproduction (paragraph [0034] of the description, FIG. 7, and the like in Patent Literature 1).

CITATION LIST

Patent Literature

Patent Literature 1: Japanese Patent Application Laid-open No. 2012-109989

DISCLOSURE OF INVENTION

Technical Problem

It is thought that projectors provided with laser light sources are widely used from now. A technology that enables a high-quality image to be displayed as described above is being demanded.

In view of the circumstances as described above, an object of the present technology is to provide an image display apparatus, an image display method, and a program capable of displaying a high-quality image.

Solution to Problem

To achieve the object described above, according to an embodiment of the present technology, there is provided an image display apparatus including a first light source module, a second light source module, an output control unit, and an image generation unit.

The first light source module emits a first laser light.

The second light source module includes a light source unit that emits a second laser light and a phosphor layer that is excited by the second laser light to emit visible light.

The output control unit controls outputs of the first laser light and the second laser light on a basis of an average and a dispersion of luminance values in pixels of an input image.

The image generation unit generates an image on a basis of the first laser light emitted from the first light source module and the visible light emitted from the second light source module.

In the image display apparatus, by the first laser light and visible light emitted from the first and second light source modules, respectively, the image is generated. At this time, on a basis of the average and dispersion of the luminance values in the pixels, the outputs of the first laser light and the second laser light are controlled. As a result, it is possible to generate and display a high-quality image.

In a case where the average of the luminance values is larger than a first threshold value, and the dispersion of the luminance values is larger than a predetermined dispersion value, the output control unit may increase the outputs of the first laser light and the second laser light.

As a result, for example, it is possible to display a bright scene image taken outdoors sufficiently clearly, and achieve high-quality image displaying.

The output control unit may increase the outputs of the first laser light and the second laser light irrespective of a degree of the dispersion of the luminance values in a case where the average of the luminance values is larger than a second threshold value larger than the first threshold value.

As a result, it is possible to display a very bright scene image sufficiently clearly.

The second threshold value may be the average of the luminance values at a time when the dispersion of the luminance values is a maximum.

By setting the second threshold value as described above, it is possible to achieve high-quality image displaying.

The output control unit may control a ratio of the outputs of the first laser light and the second laser light.

By controlling the ratio of the outputs on the basis of the average and dispersion of the luminance values, it is possible to achieve high-quality image displaying.

The output control unit may perform normalization for a domain range of the dispersion of the luminance values with respect to the average of the luminance values, and control the outputs on a basis of the average and the dispersion after the normalization.

As a result, on the basis of the average and dispersion, the calculation or the like for controlling the outputs of the laser lights can be easily performed.

The first laser light may have a wavelength range including a first color. In this case, the visible light may have a wavelength range including a second color different from the first color. Further, the output control unit may calculate hues of the pixels on a basis of the input image, and control a ratio of the outputs of the first laser light and the second laser light on a basis of the calculated hues of the pixels.

As a result, it is possible to display a high-quality image which is just like the scene is seen with a naked eye.

The first color may be blue. In this case, the second color may be yellow. Further, the output control unit may classify the pixels of the input image on a basis of the hues, and control the ratio of the outputs on a basis of at least one of a number of pixels classified into a hue of a cool color and a number of pixels classified into a hue of a warm color.

As a result, it is possible to display a bluish scene image brightly and vividly.

The output control unit may increase the ratio of the first laser light in a case where a rate of the number of pixels classified into the hue of the cool color with respect to a total number of pixels is more than a third threshold value.

As a result, it is possible to achieve high-quality image displaying.

The output control unit may increase the ratio of the first laser light in a case where a rate of the number of pixels classified into the hue of the warm color with respect to a total number of pixels is less than a fourth threshold value, and a rate of a number of pixels classified into a hue of an achromatic color with respect to the total number of pixels is less than a fifth threshold value.

As a result, it is possible to achieve high-quality image displaying.

According to an embodiment of the present technology, there is provided an image display method including calculating luminance values of pixels on a basis of image information.

On a basis of an average and a dispersion of the calculated luminance values, an output of a first laser light emitted from a first light source module and an output of a second laser light emitted to a phosphor layer held by a second light source module as excitation light are controlled.

An image is generated on a basis of the first laser light emitted from the first light source module and visible light emitted from the phosphor layer by excitation and emitted from the second light source module.

According to an embodiment of the present technology, there is provided a program causing an image display apparatus to execute:

a step of calculating luminance values of pixels on a basis of image information;

a step of controlling, on a basis of an average and a dispersion of the calculated luminance values, an output of a first laser light emitted from a first light source module and an output of a second laser light emitted to a phosphor layer held by a second light source module as excitation light; and a step of generating an image on a basis of the first laser light emitted from the first light source module and visible light emitted from the phosphor layer by excitation and emitted from the second light source module.

According to another embodiment of the present technology, there is provided an image display apparatus including a first light source module, a second light source module, an output control unit, and an image generation unit.

The first light source module emits a first laser light having a wavelength range including a first color.

The second light source module includes a light source unit that emits a second laser light and a phosphor layer that is excited by the second laser light to emit visible light having a wavelength range including a second color different from the first color.

The output control unit controls outputs of the first laser light and the second laser light on a basis of hues in pixels of an input image.

The image generation unit generates an image on a basis of the first laser light emitted from the first light source module and the visible light emitted from the second light source module.

In the image display apparatus, the image is generated with the first laser light and the visible light emitted from the first and second light source modules, respectively. At this time, on a basis of hues in the pixels, the outputs of the first laser light and the second laser light are controlled. As a result, it is possible to generate and display the high-quality image.

According to an embodiment of the present technology, there is provided an image display method including calculating hues of pixels on a basis of image information.

On a basis of the calculated hues of the pixels, an output of a first laser light emitted from a first light source module and an output of a second laser light emitted to a phosphor layer held by a second light source module as excitation light are controlled.

An image is generated on a basis of the first laser light emitted from the first light source module and visible light emitted from the phosphor layer by excitation and emitted from the second light source module.

According to an embodiment of the present technology, there is provided a program causing an image display apparatus to execute:

a step of calculating hues of pixels on a basis of image information;

a step of controlling, on a basis of the calculated hues of the pixels, an output of a first laser light emitted from a first light source module and an output of a second laser light emitted to a phosphor layer held by a second light source module as excitation light; and a step of generating an image on a basis of the first laser light emitted from the first light source module and visible light emitted from the phosphor layer by excitation and emitted from the second light source module.

Advantageous Effects of Invention

As described above, according to the present technology, it is possible to display the high-quality image. It should be noted that the effects described herein are not limited, and any effect described in this disclosure may be obtained.

BRIEF DESCRIPTION OF DRAWINGS

FIGS. 10A, 10B, 10C, and 10D Tables showing values, coefficients, and the like calculated by operations.

MODE(S) FOR CARRYING OUT THE INVENTION

Hereinafter, embodiments of the present technology will be described with reference to the drawings.

[Image Display Apparatus]

Figure 1:
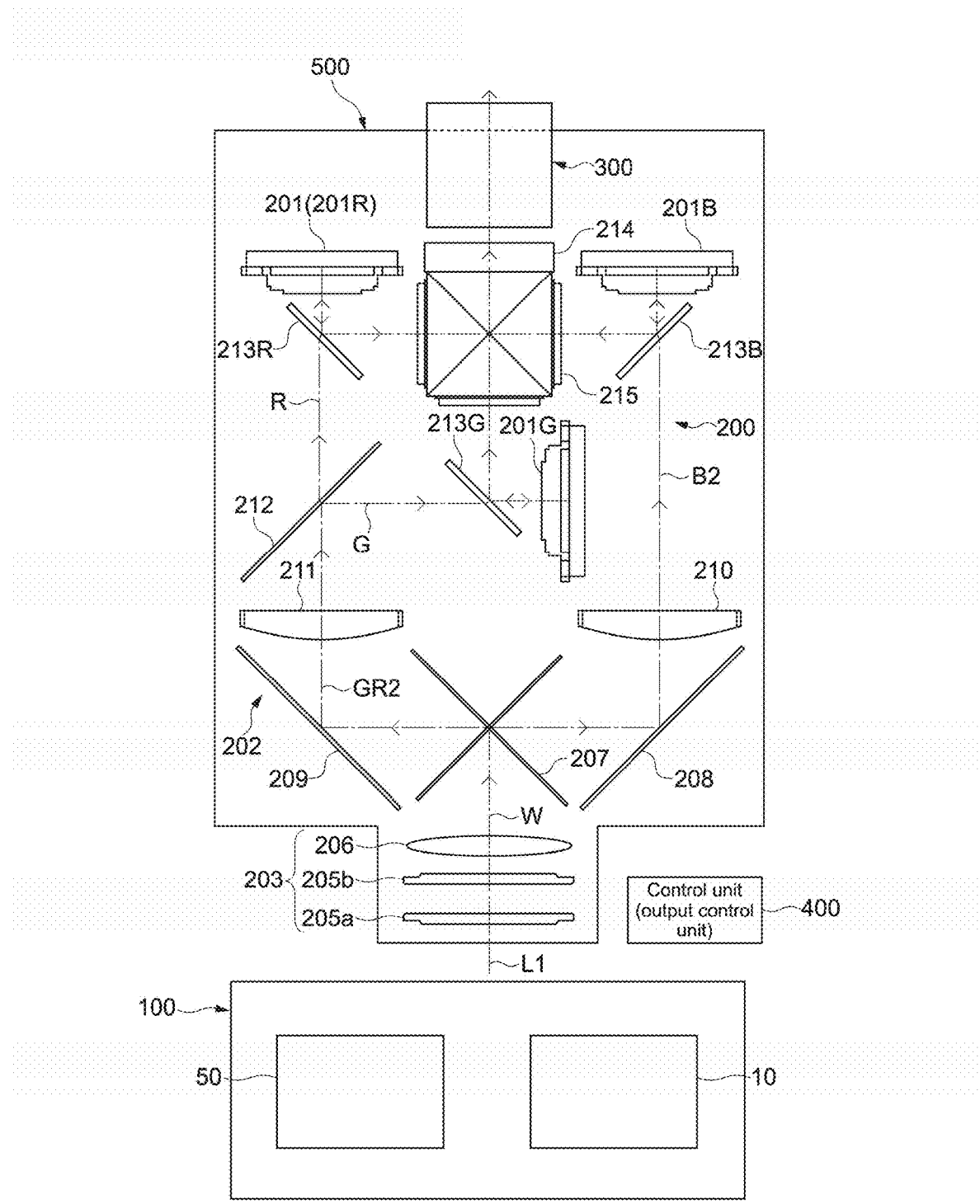
FIG. 1 A schematic diagram showing a configuration example of an image display apparatus according to an embodiment of the present technology.

FIG. 1 is a schematic diagram showing a configuration example of an image display apparatus according to an embodiment of the present technology. An image display apparatus 500 is used as a projector for presentation or digital cinema, for example. To image display apparatuses used for other purposes, the present technology described below can be applied.

The image display apparatus 500 includes a light source apparatus 100, an image generation system 200 that generates an image on a basis of a white light W emitted from the light source apparatus 100, a projection system 300 that projects the image generated by the image generation system 200 on a screen (not shown) or the like, and a control unit 400.

Figure 2A:
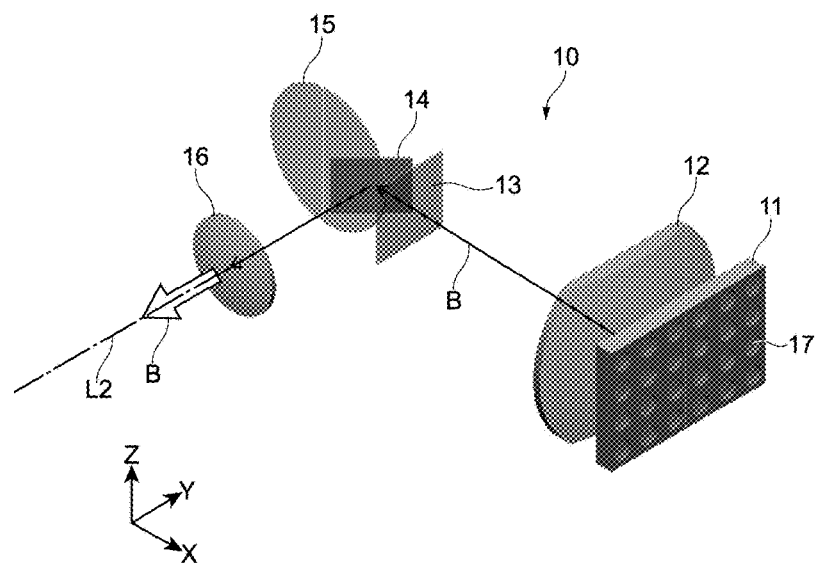
FIGS. 2A and 2B Schematic diagrams showing a configuration example of an optical system of a B light source module.
Figure 2B:
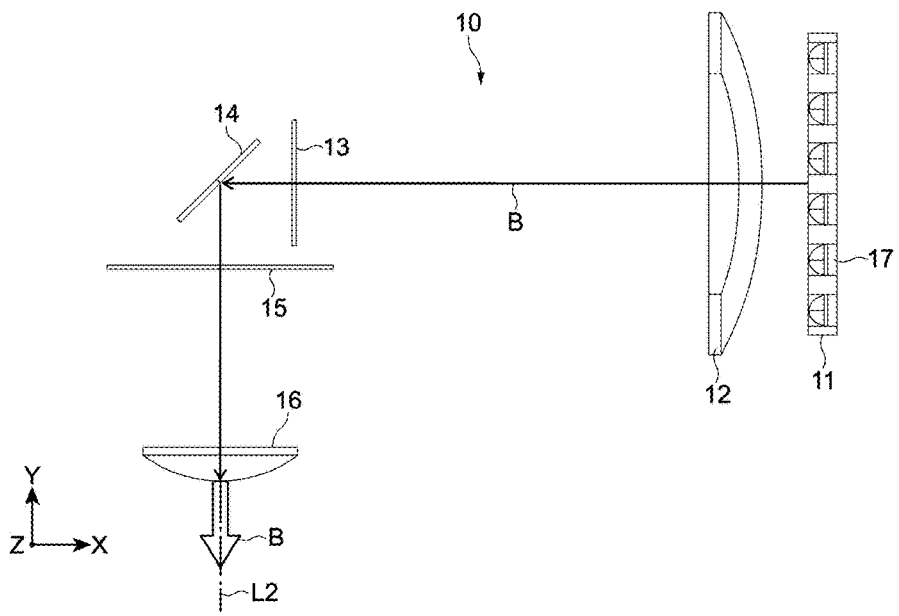
Figure 3A:
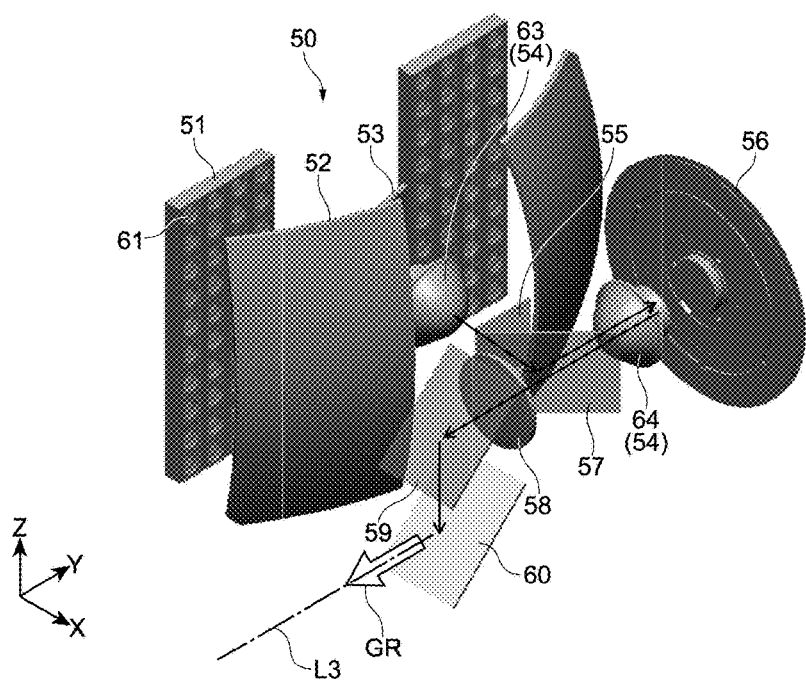
FIGS. 3A and 3B Schematic diagrams showing a configuration example of an optical system of a GR light source module.
Figure 3B:
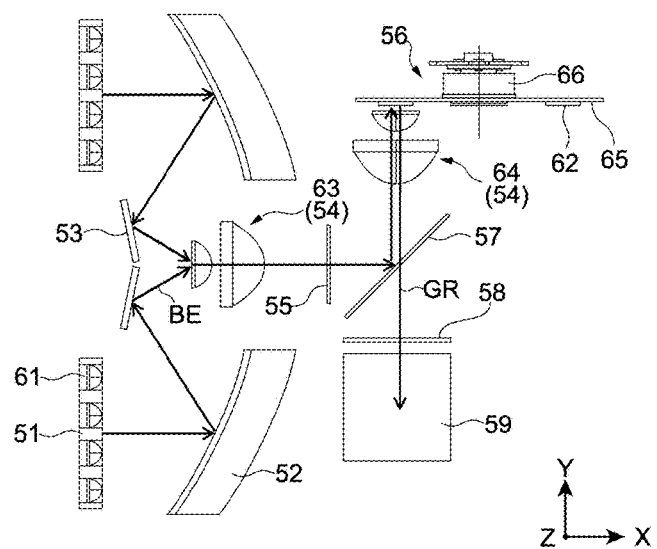

The light source apparatus 100 includes a B light source module 10 that emits a blue laser light B (see FIGS. 2A and 2B) in a blue wavelength range and a GR light source module 50 that emits light in a wavelength range from a red wavelength range to a green wavelength range (that is, yellow light) GR (see FIGS. 3A and 3B). The blue laser light B emitted from the B light source module 10 and the yellow light GR emitted from the GR light source module 50 are synthesized to generate the white light W. As shown in FIG. 1, the white light W is emitted to the image generation system 200 along an optical axis L1.

In this embodiment, the B light source module 10 and the GR light source module 50 correspond to a first light source module and a second light source module. Further, the blue laser light B corresponds to a first laser light that has a blue color as a first color. The yellow light GR corresponds to visible light that has a yellow color as a second color. It should be noted that colors of light emitted from the light source modules are not limited, and light with another color may be emitted.

In this embodiment, the image generation system 200 functions as an image generation unit, and includes a plurality of reflective liquid crystal light valves (image generation elements) 201, an illumination optical system 202 that guides light to each of the liquid crystal light valves 201, and a dichroic prism 214.

The illumination optical system 202 includes an integrator optical system 203, a first dichroic mirror 207, two reflection mirrors 208 and 209, two collective lenses 210 and 211, a second dichroic mirror 212, and reflective polarization elements 213R, 213G, and 213B.

The integrator optical system 203 includes a pair of fly-eye lenses 205a and 205b and a condenser lens 206. By the integrator optical system 203, a luminance distribution of the white light W emitted onto optical axis L1 is set, and the light is emitted to the first dichroic mirror 207.

The first dichroic mirror 207 disperses the white light W emitted from the condenser lens 206 into a blue light B2 on a short wavelength side and a yellow light GR2 on a long wavelength side. The blue light B2 and the yellow light GR2 are light in wavelength ranges approximately equal to those of the blue laser light B emitted from the B light source module 10 and the yellow light GR emitted from the GR light source module 50, respectively.

The blue light B2 dispersed by the first dichroic mirror 207 is incident on the liquid crystal light valve 201B through the first reflection mirror 208, the first collective lens 210, and the reflective polarization element 213B. The yellow light GR2 is emitted to the second dichroic mirror 212 through the second reflection mirror 209 and the collective lens 211.

The second dichroic mirror 212 disperses the yellow light GR2 into a green light G on a short wavelength side and a red light R on a long wavelength side. The dispersed red light R is incident on the liquid crystal light valve 201R through the reflective polarization element 213R. The green light G is incident on the liquid crystal light valve 201G through the reflective polarization element 213G.

Figure 7:
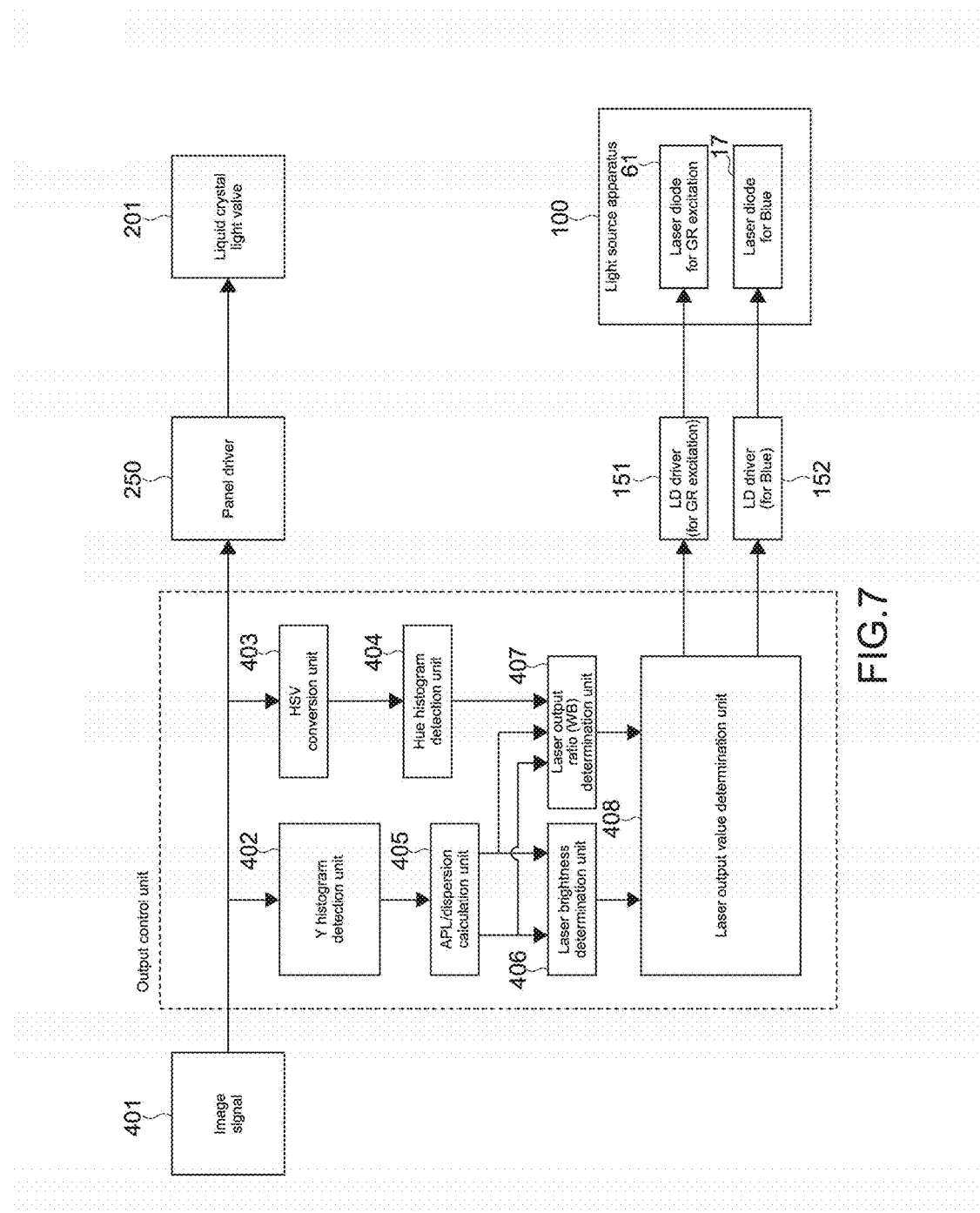
FIG. 7 A block diagram showing a functional configuration example of an output control unit.

The liquid crystal light valves 201R, 201G, and 201B modulate and reflect incident light for each pixel on a basis of a drive signal output from a panel driver 250 (see FIG. 7). The modulated three image light beams of RGB are reflected by the reflective polarization elements 213R, 213G, 213B, and are incident on the dichroic prism 214 via a polarization plate 215.

The dichroic prism 214 synthesizes the three image light beams modulated by the liquid crystal light valve 201R, 201G, and 201B on the same optical path, and emits the light toward the projection system 300. The projection system 300 has a lens (not shown) or the like, and scales up the synthesized light by a predetermined factor to emit the light on a screen or the like. As a result, a full color image is displayed.

The control unit 400 controls operations of mechanisms in the image display apparatus 500. The control unit 400 includes, for example, a CPU (Central Processing Unit), a RAM (Random Access Memory), a ROM (Read Only Memory), and the like. The CPU loads a program recorded in advance in the ROM into the RAM and executes the program, thereby executing various processes. A specific configuration of the control unit 400 is not limited, and arbitrary hardware and software may be used as appropriate.

In this embodiment, the CPU of the control unit 400 executes a predetermined program, thereby achieving an output control unit.

FIGS. 2A and 2B are schematic diagrams showing a configuration example of the optical system of the B light source module 10. FIG. 2A is a perspective view of the optical system of the B light source module 10 obliquely viewed. FIG. 2B is a plan view of the optical system of the B light source module 10 viewed from above (in a Z axis direction).

The B light source module 10 includes a light source block 11, a collective lens 12, a diffuser panel 13, a reflection mirror 14, a rotation diffuser panel 15, and an exit lens 16. The light source block 11 is provided with a plurality of laser light sources 17 that emits the blue laser light B. For example, the plurality of laser light sources 17 emits the blue laser light B, a center wavelength (peak wavelength of emission intensity) of which is set within a blue wavelength range of approximately 400 nm to 500 nm.

The collective lens 12 is disposed in front of the light source block 11, and collects the blue laser light B onto the diffuser panel 13. The blue laser light B, a light beam diameter of which is increased by the diffuser panel 13 is reflected by the reflection mirror 14 by approximately 90 degrees. As shown in FIGS. 2A and 2B, when assumption is made that an emission direction of the laser light sources 17 is set to an X axis direction, the blue laser light B is reflected in a Y axis direction by the reflection mirror 20.

The rotation diffuser panel 15 is caused to perform rotary drive by a motor (not shown) or the like, and emits the blue laser light B to the exit lens 16. The exit lens 16 causes the blue laser light B to exit along an optical axis L2 extended along the Y axis direction.

FIGS. 3A and 3B are schematic diagrams showing a configuration example of the optical system of the GR light source module 50. FIG. 3A is a perspective view showing the optical system of the GR light source module 50 when obliquely viewed. FIG. 3B is a plan view of the optical system of the GR light source module 50 when viewed from above (in Z axis direction). It should be noted that coordinate axes of XYZ are set in the same directions as in FIGS. 2A and 2B.

The GR light source module 50 includes two light source blocks 51, two aspherical mirrors 52, two planar mirrors 53, a collective lens system 54, a diffuser panel 55, a phosphor wheel 56, a separation filter 57, an exit lens 58, a reflection mirror 59, and an exit mirror 60.

The two light source blocks 51 are respectively provided with a plurality of laser light sources 61. The plurality of laser light sources 61 is used as an excitation light source that emits excitation light for exciting a phosphor layer 62 formed in the phosphor wheel 56. In this embodiment, as the excitation light, blue laser light BE, a center wavelength of which is set within the blue wavelength range of approximately 400 nm to 500 nm.

In this embodiment, the two light source blocks 51 and the blue laser light BE correspond to a light source unit and second laser light, respectively. It should be noted that the aspherical mirror 52, the collective lens system 54, or the like may function as a part of the light source unit that guides the blue laser light BE to the phosphor layer 62.

As shown in FIGS. 3A and 3B, the light source blocks 51 are disposed in such a manner that emission directions of the laser light sources 61 are directed in parallel to the X axis direction. That is, the light source blocks 51 are arranged so as to face the light source block 11 of the B light source module 10 in the X axis direction.

The two aspherical mirrors 52 are disposed in front of the light source blocks 51 and reflect and collect the blue laser light BE. The blue laser light BE emitted from the light source blocks 51 is reflected by the aspherical mirrors 52 toward a gap between the two light source blocks 51 like being folded back. The reflected blue laser light BE is reflected by the two planar mirrors 53 like being folded again, and is connected to an entrance of the collective lens system 54.

The collective lens system 54 includes an entrance side lens group 63 that diffuses the collected blue laser light BE and substantially parallelizes the light and an exit side lens group 64 that collects the parallelized blue laser light on the phosphor layer 62 formed in the phosphor wheel 56. The entrance side lens group 63 and the exit side lens group 64 are disposed in such a manner that orientations of those are crossed at an angle of 90 degrees.

The diffuser panel 55 and the separation filter 57 are disposed in front of the entrance side lens group 63 in this order. The blue laser light BE that exits the entrance side lens group 63 enters the separation filter 57 through the diffuser panel 55. The separation filter 57 reflects the blue laser light BE toward the exit side lens group 63. The reflected blue laser light BE is collected on the phosphor layer 62 of the phosphor wheel 56 by the exit side lens group 64.

The phosphor wheel 56 is disposed on a back surface side of the exit side lens group 64. The phosphor wheel 56 is a reflective phosphor wheel, and includes a substrate 65 made of a crystalline member such as sapphire and the phosphor layer 62 formed on the substrate 65, for example.

The phosphor layer 62 includes a phosphor that emits fluorescence by being excited by the blue laser light BE. When the phosphor layer 62 is excited, the blue laser light BE is converted into the yellow light GR. The yellow light GR generated from the phosphor layer 62 is reflected by the substrate 65 toward the exit side lens group 64.

The phosphor wheel 56 is caused to perform rotary drive by a motor 66. As a result, a point on which excitation light is collected is relatively moved, and thus fluorescence saturation, combustion, or the like is suppressed. It should be noted that as the phosphor included in the phosphor layer 62, for example, a YAG (Yttrium Aluminum Garnet)-based phosphor is used. The present technology can be applied to a case where another phosphor is used.

The exit side lens group 64 substantially parallelizes the yellow light GR generated from the phosphor layer 62 and causes the light to exit toward the separation filter 57. The yellow light GR transmits through the separation filter 57 and enters the reflection mirror 59 through the exit lens 58. The reflection mirror 59 reflects the yellow light GR toward the exit mirror 60 disposed on a lower side thereof in the X axis direction. The exit mirror 60 causes the yellow light GR to exit along an optical axis L3 extended in the Y axis direction.

By synthesizing the blue laser light B exited along the optical axis L2 with the yellow light GR exited along the optical axis L3, the white light W shown in FIG. 1 is generated. For example, as the exit mirror 60 shown in FIGS. 3A and 3B, a separation filter that reflects the yellow light GR and transmits the blue laser light B is used. Further, on a back surface side of the exit mirror 60, the exit lens 16 shown in FIGS. 2A and 2B is disposed in such a manner that the optical axis L2 and the optical axis L3 coincide with each other. As a result, along the same optical axis, the blue laser light B and the yellow light GR can be emitted.

A method and configuration for causing the blue laser light B and the yellow light GR to emit along the same optical axis is not limited. For example, an optical system or the like that guides the blue laser light B and the yellow light GR onto the same optical axis may be additionally configured.

It should be noted that the configuration of the optical system of the B light source module 10 and the configuration of the optical system of the GR light source module 50 are not limited to the configurations described above. In addition, a configuration of a holding mechanism that holds the optical systems is not limited and may be designed as appropriate.

[Output Control for Blue Laser Lights B and BE]

Figure 4:
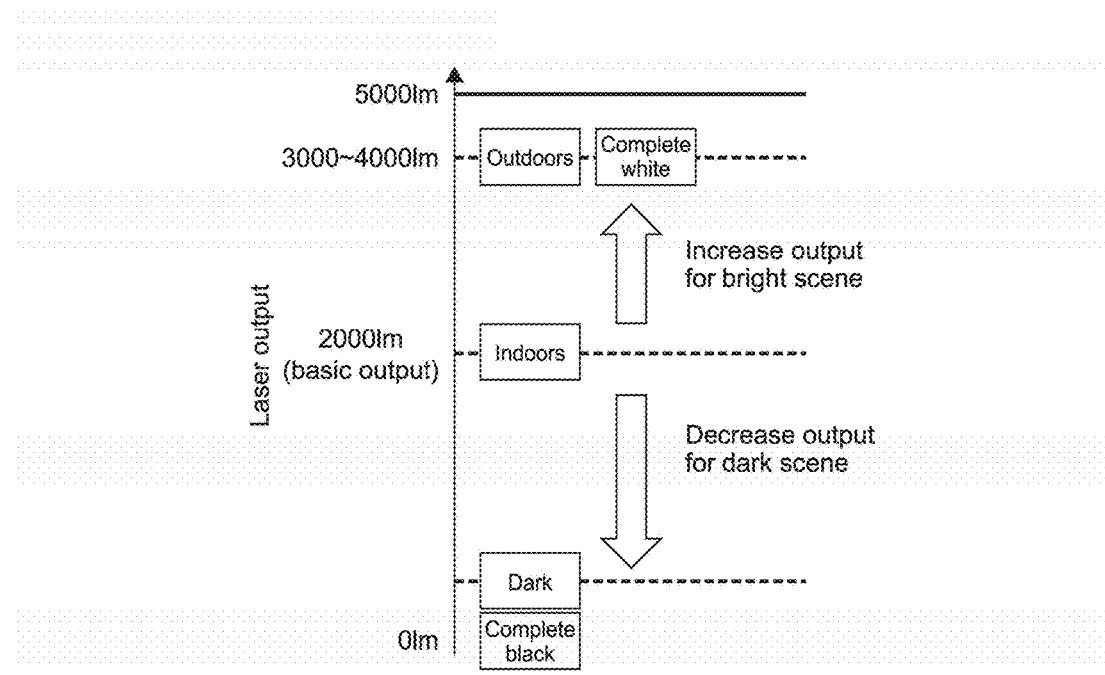
FIG. 4 A diagram showing an outline of output control for blue laser lights B and BE according to the present technology.

Output control for the blue laser lights B and BE by the output control unit will be described. FIG. 4 is a diagram for explaining an outline thereof. For example, for the plurality of laser light sources 17 of the B light source module 10 and the plurality of laser light sources 61 of the GR light source module 50, output control can be performed within a range from 0 lm to 5000 lm. Further, as a basic output, 2000 lm is set. Of course, the value is not limited to this.

In this embodiment, in a case where an image to be displayed (for example, frame image or the like) is an image of a dark scene such as a streetscape in the middle of a night, outputs of the blue laser lights B and BE are lowered. Further, in a case where the image is an image of a scene in an ordinary brightness in doors in a daytime or the like, the outputs of those are set at the basic output. Further, in the case where the image is an image of an outdoor, bright scene in a daytime at a time when the weather is good or the like, the outputs of the blue laser lights B and BE are increased. In this case, for example, the blue laser lights B and BE are emitted at an output of from 3000 lm to 4000 lm.

It should be noted that in a case where completely black image is displayed, the output is set at 0 lm. On the other hand, in the case where completely white image is displayed, the output is set to from 3000 lm to 4000 lm. At a time when the completely white image is displayed, the output may be set at a maximum of 5000 lm.

As described above, at a time when the image of the bright scene is displayed, the outputs of the blue laser lights B and BE are increased, and thus it is possible to display a brighter image corresponding to the bright scene can be displayed. As a result, it is possible to display a high-quality image which is just like a bright scene is seen with a naked eye.

Here, the inventor of the present invention studied a way of determining whether the image is a bright scene image as a target of an increase in the outputs, an ordinary bright scene image to be displayed at the basic output, or a dark scene image as a target of a decrease in the outputs. As a result, the inventor of the present invention newly conceived of a method of determination based on an APL (Average Picture Level), which is an average of calculated luminance values of pixels included in the image and a distribution (contrast) of the luminance values.

Figure 5:
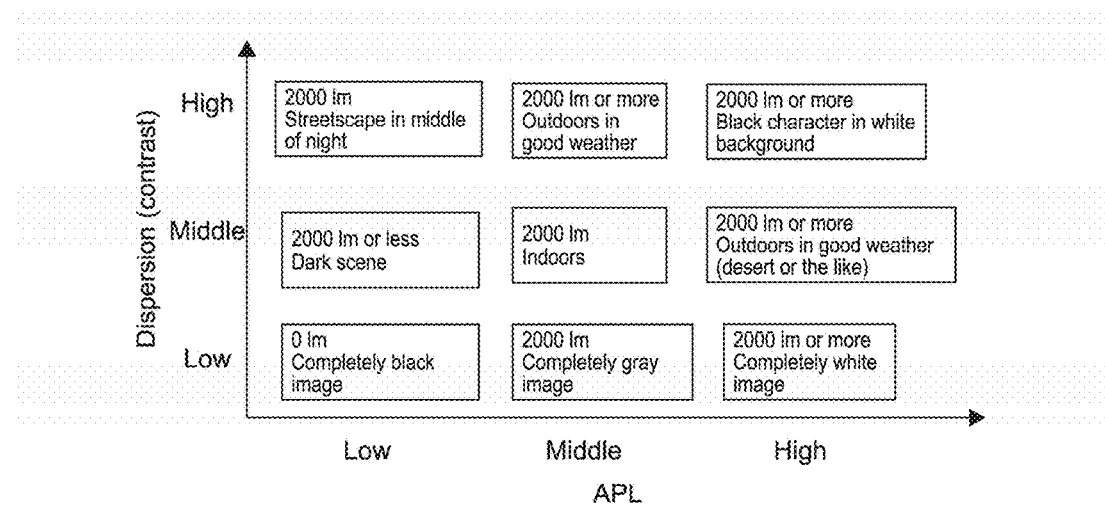
FIG. 5 A schematic diagram showing a relationship between various scene images and dispersion and an APL of a luminance value.

FIG. 5 is a schematic diagram showing a relationship between the respective scene images and the APL and distribution of the luminance values. When attention is focused on the APL and distribution of the luminance values of images obtained by taking various scenes, the following result is obtained and shows an arrangement as shown in FIG. 5. Further, the outputs of the blue laser lights B and BE at a time of displaying the images are set as follows on a basis of the APL and distribution of the luminance values.

Completely black image . . . low APL/low distribution (set to 0 lm)

Dark scene . . . low APL/middle distribution (set to value lower than basic output of 2000 lm)

Streetscape in middle of night . . . low APL/high distribution (set to basic output of 2000 lm)

Completely gray image . . . middle APL/low distribution (set to basic output of 2000 lm)

Indoors . . . middle APL/middle distribution (set to basic output of 2000 lm)

Outdoors in good weather . . . middle APL/high distribution (set to value higher than basic output of 2000 lm)

Completely white image . . . high APL/low distribution (set to value higher than basic output of 2000 lm)

Outdoors in good weather (desert or the like) . . . high APL/middle distribution (set to value higher than basic output of 2000 lm)

Black character in white background . . . high APL/high distribution (set to value higher than basic output of 2000 lm)

Figure 6:
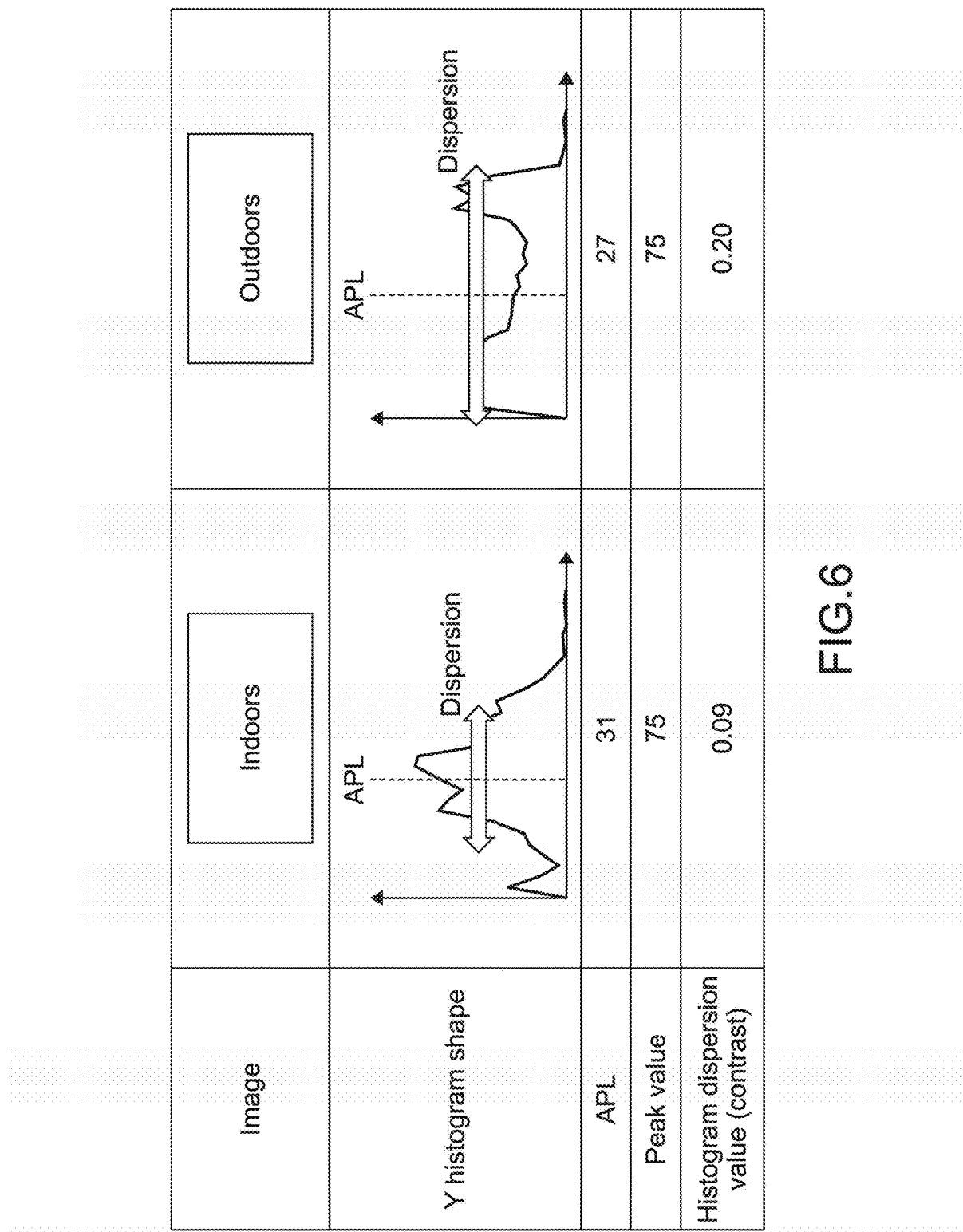
FIG. 6 A diagram schematically showing a shape of a Y histogram of a luminance value of each of an indoor image and an outdoor image in clear weather.

In particular, FIG. 6 schematically shows a shape of a histogram (Y histogram) of the luminance values of the images of indoors and outdoors in good weather. As shown in FIG. 6, the images of the indoors and outdoors in good weather had APLs and peak values of the luminance values which are substantially equal to each other. On the other hand, the images of the indoors and outdoors in good weather had histogram distribution values which are different from each other. Therefore, attention is focused on not only the APL but also the dispersion value, and when the outputs were controlled as described on the basis of those parameters, a very high-quality image can be displayed.

Further, in this embodiment, on a basis of a histogram of a hue of each pixel included in the image to be displayed, an output ratio of the blue laser lights B and BE is controlled. As shown in FIGS. 1, 2A, 2B, 3A, and 3B, the light source apparatus 100 according to this embodiment can emit the blue laser light B and the yellow light GR by two systems independently of each other. Thus, on a basis of the hue histogram, the output ratio of the blue laser light B and the yellow light G is controlled, with the result that a high-quality image can be displayed.

It should be noted that the output control for the yellow light GR can be performed by controlling the output of the blue laser light BE as excitation light. Thus, the output ratio of the blue laser light B and yellow light G can be controlled by controlling the output ratio of the blue laser lights B and BE.

In this embodiment, for example, when a taken image of a blue scene such as sky and sea is displayed, the output of the blue laser light B is controlled to be relatively higher. As a result, the blue scene image can be displayed to be bluer and vivid. It is possible to display a high-quality image which is just like the scene is seen with a naked eye.

Figure 8:
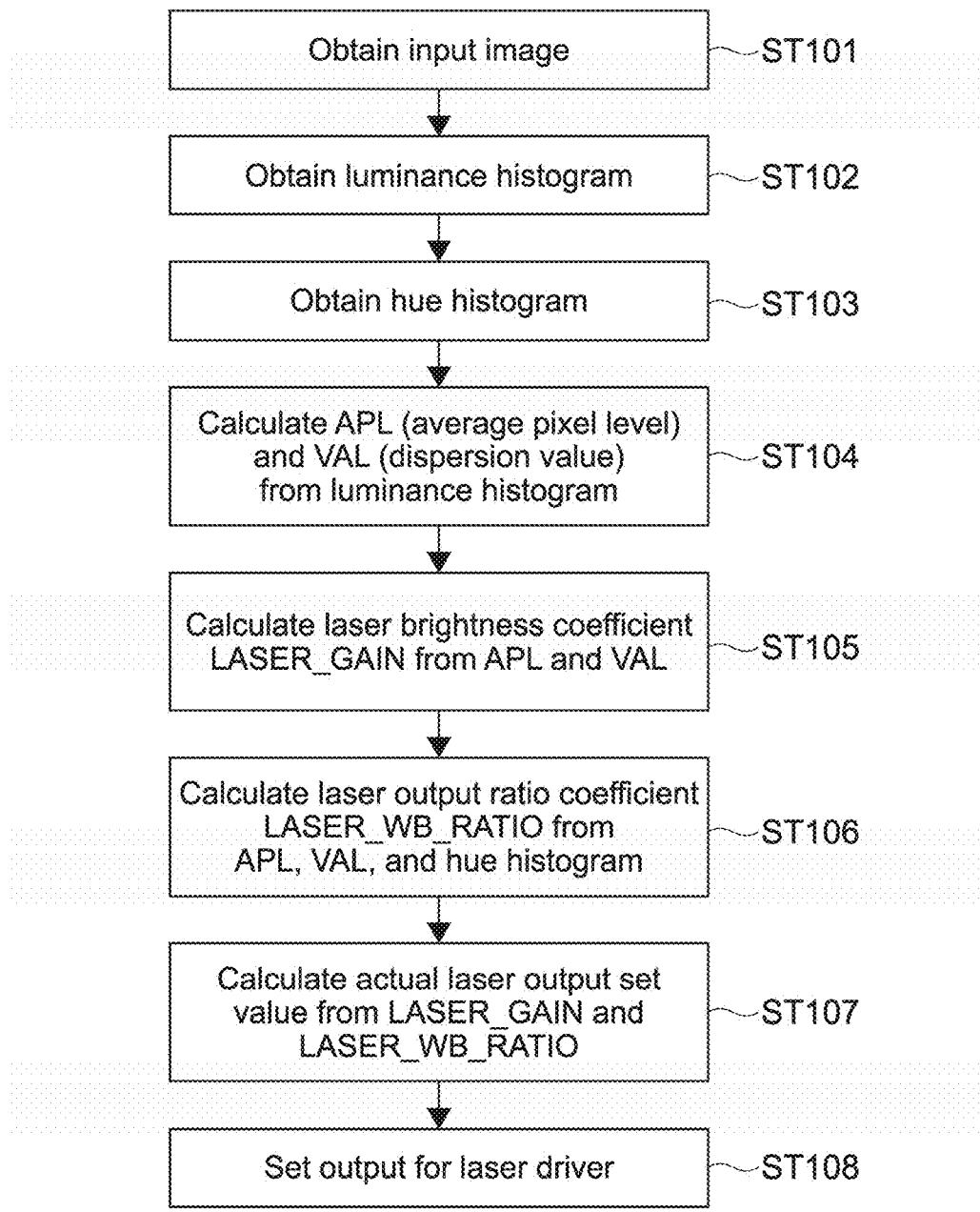
FIG. 8 A flowchart showing a process example of output control according to this embodiment.

Hereinafter, description will be given on a specific operation example of the output control described above. FIG. 7 is a block diagram showing a functional configuration example of the output control unit. FIG. 8 is a flowchart showing a process example of the output control according to this embodiment. It should be noted that in the example shown in FIG. 7, the output control unit outputs a panel control signal based on an image signal (image information) to the panel driver 250. On a basis of the received panel control signal, the panel driver 250 outputs a drive signal to the liquid crystal light valve 201.

From a signal input unit 401 to which an image signal of an image to be displayed is input, the image signal is obtained (Step 101). The image signal is output to a Y histogram detection unit 402 and an HSV conversion unit 403. It should be noted that the image signal includes information relating to RGB values as pixel values of pixels that constitute the image. However, the input image signal is not limited to the RGB Signa, and a YCbCr signal or an HSV signal may be directly input.

The Y histogram detection unit 402 calculates a luminance value Y of each pixel and generates the luminance histogram (Step 102). As shown in the following expression, a transformation matrix A of 3*3 is used to calculate each value of YCbCr including the luminance value Y from the RGB values of the pixels.

$$\begin{pmatrix} Y \\ Cb \\ Cr \end{pmatrix} = (A) \begin{pmatrix} G \\ B \\ R \end{pmatrix}$$ [Mathematical 1]

$$(A) = \begin{pmatrix} 0.7152 & 0.0722 & 0.2126 \\ -0.3854 & 0.5000 & -0.1146 \\ -0.4542 & -0.0458 & 0.5000 \end{pmatrix}$$

It should be noted that specific values of respective components of the transformation matrix A are not limited, and may be set as appropriate, for example, so as to exert a desired color characteristic or the like or in accordance with a predetermined format. That is, an arbitrary transformation matrix for calculating the luminance value Y from the RGB value may be used.

In the case where the YCbCr signal is input as the image signal, the luminance value Y included in the signal is used as it is. Further, also in a case where the HSV signal or the like other than the RGB signal is input as the image signal, by using a known calculation or the like is used, for example, the luminance value Y can be calculated.

Figures 9A, 9B:
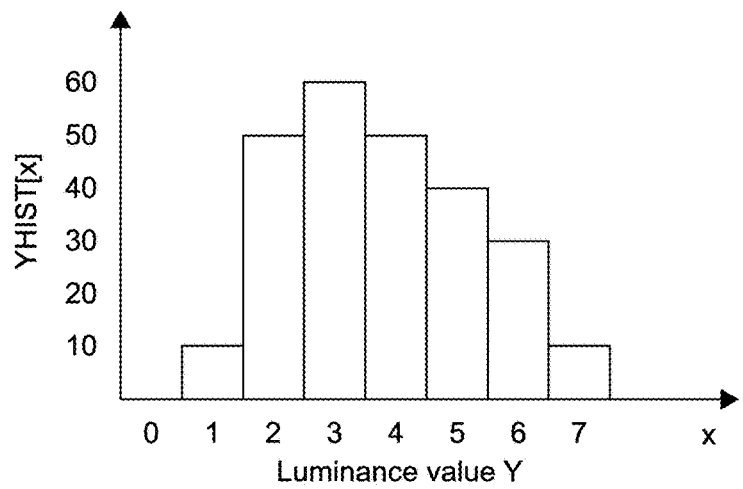
FIGS. 9A and 9B Diagrams schematically showing an example of a histogram of luminance values.

FIGS. 9A and 9B show diagrams schematically showing an example of the histogram of the luminance value Y. FIG. 9A is a graph of the Y histogram, and FIG. 9B is a table showing frequencies or the like of classes. Here, to clearly explain a method of calculating the APL and distribution of the luminance values, a schematic histogram is exemplified.

As shown in FIGS. 9A and 9B, a range (from 0 to maximum value) of the luminance value Y to be calculated is divided into eight classes (x=0 to 7) each having the same width. YHIST[x] shown in FIGS. 9A and 9B indicates frequencies of the classes, that is, a number of pixels included in the respective classes (actually, which is a larger number). WT[x] shown in FIG. 9B indicates weighting coefficients corresponding to the respective classes, numbers that indicate the respective classes (x=0 to 7) are set as they are, but of course are not limited to this.

The HSV conversion unit 403 and a hue histogram detection unit 404 calculate hue values of respective pixels and generate a hue histogram (Step 103). First, the HSV conversion unit 403 uses the following expression to calculate each value of HSV including a hue value H from the YCbCr value.

$H = \arctan(Cr/Cb)$ $S = (Cb^2 + Cr^2)^{1/2}$ $V = Y$ [Mathematical 2]

It should be noted that the YCbCr value may be calculated from the RGB value again, or a calculation result of the Y histogram detection unit 402 may be used.

On a basis of the calculated HSV value, as the hue histogram, the respective pixels are classified on a basis of the hue, and the number thereof is counted. In this embodiment, the respective pixels are classified into any one of the hues of a warm color, a cool color, an achromatic color, and a neutral color. It should be noted that in this embodiment, a pixel having a low chroma value S is counted as a pixel with an achromatic color irrespective of degrees of the hue value H and a lightness value.

For the other pixels, the range of the hue value H (from 0 to maximum value) is divided into approximately quartered. Pixels included in the lowest value range of the hue value H among the four ranges are counted as pixels with the warm color. Pixels included in the second lowest value range of the hue value H are counted as pixels with the cool color. Pixels included in one of the highest and second highest value ranges of the hue value H are counted as pixels with the neutral color.

The method of classifying the pixels into any one hue of the warm color, cool color, achromatic color, and neutral color is not limited to the method described above. For example, appropriate setting may be performed so as to exert a desired color characteristic or the like. Further, the number of pixels counted for each hue may be normalized as appropriate.

An APL/dispersion calculation unit 405 calculates the APL and dispersion value (VAL) of the luminance values Y (Step 104). In this embodiment, by using the weighting coefficient WT[x] shown in FIG. 9B, the APL is calculated from the following expression.

APL=(Σ(YHIST[x]*WT[x]))/(Σ(YHIST[x]))/max(WT[x]) [Mathematical 3]

With reference to FIG. 10A, 3.8 (rounded off to one decimal place), which is a result obtained by dividing 830 by 250 is calculated as an APL raw. To normalize the value, the value is divided by 7 as maxWT[x], as a normalized APL, 0.5 (rounded off to one decimal place) is obtained. In this embodiment, the value is used as an average of the luminance values.

For the dispersion value, first, from the following expression, a VAL_raw is calculated.

VAL_raw=Σ(YHIST[x]*(WT[x]/max(WT[x])−APL)²)/Σ(YHIST[x]) [Mathematical 4]

Figure 11:
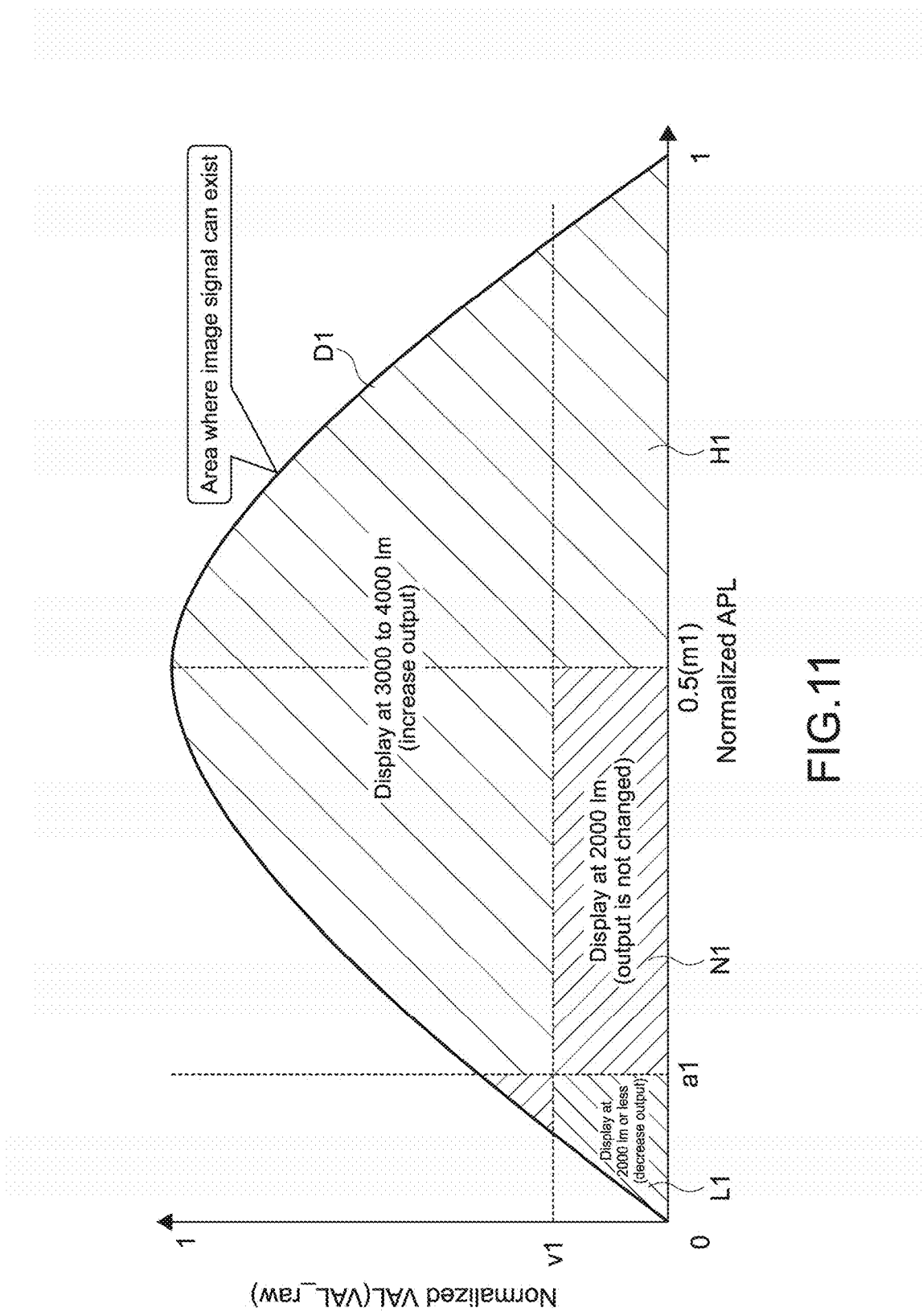
FIG. 11 A graph schematically showing a relationship between an APL and a VAL_raw domain.

By adding a value described in FIG. 10B, 11.95102 is obtained as shown in FIG. 10C. This value is divided by 250, VAL_raw=0.047804 is obtained.

FIG. 11 is a graph schematically showing a domain relationship between the normalized APL and the VAL_raw calculated from the above expressions. That is, in a coordinate system of the APL/VAL_raw, a domain D1 of the VAL_raw with respect to the normalized APL is a bell-shaped area. Within the bell-shaped area, an image signal can exist.

As shown in FIG. 11, the domain D1 is divided into a low output area L1, a basic output area N1, and a high output area H1. Specifically, for the APL, a threshold value a1 (first threshold value) and an APL threshold value m1 (second threshold value) at a time when the dispersion of the luminance values is a maximum are determined. Further, for the VAL, a threshold value v1 (predetermined dispersion value) is determined. By using those threshold values, the areas are defined as follows. A method of setting the threshold values is not limited.

Low output area L1 . . . area where APL is smaller than threshold value a1, and VAL is smaller than threshold value v1

Basic output area N1 . . . area where APL is threshold value a1 or larger and threshold value m1 or smaller, VAL is smaller than threshold value v1, APL is smaller than threshold value a1, and VAL is larger than threshold value v1

High output area H1 . . . area where APL is larger than threshold value a1, VAL is larger than threshold value v1, and APL is larger than threshold value m1

By defining the areas as described above, in accordance with the APL and VAL calculated from the image signal, it is possible to perform the output control according to the present technology based on the average and dispersion of the luminance values described with reference to FIG. 5. It should be noted that as shown in FIG. 11, as the threshold value m1, the APL at a time when the dispersion of the luminance values is a maximum is set. As a result, high-quality image displaying is achieved. The value there of is not limited to this, and as the threshold value m1, another value larger than the threshold value a1 may be set.

It should be noted that in this embodiment, by using the following expression, a value of VAL_raw is normalized.

$$VAL=VAL\_raw/(coef\_a*(APL-coef\_c)^2+coef\_b) \quad \text{[Mathematical 5]}$$

With reference to FIG. 10D, coefficients of the normalization are coef_a=−1, coef_b=0.25, coef_c=0.5. Further, the normalized VAL is 0.2 (rounded off to one decimal place).

Figure 12:
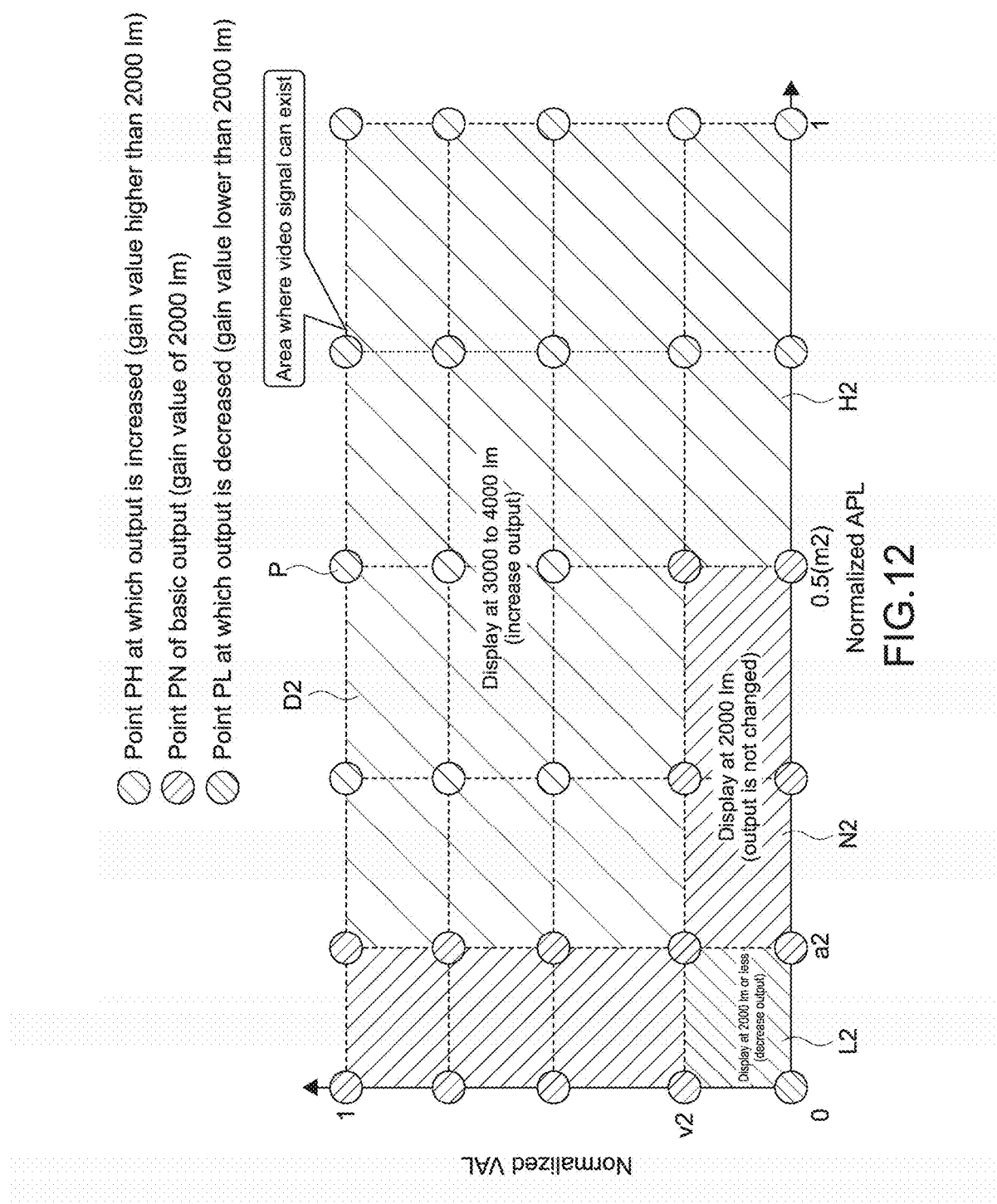
FIG. 12 A graph schematically showing a relationship between an APL and a normalization VAL domain.

FIG. 12 is a graph schematically showing a domain relationship between the normalized APL and the normalized VAL. In a coordinate system of an APL/normalized VAL, a domain D2 of the normalized VAL with respect to the normalized APL is a substantially quadrangular area. That is, in this embodiment, by using the above expression, a range of the domain of the dispersion value with respect to the normalized APL (hereinafter, simply referred to as APL) is normalized. By using a normalized VAL (hereinafter, simply referred to as VAL) as the normalized dispersion value, it becomes easier to perform parameter design, program design, and the like for the output control. As a result, it is easily possible to perform the output control for the blue laser lights B and BE based on the APL and VAL.

As shown in FIG. 12, a threshold value a2 and a threshold value m2 for the APL and a threshold value v2 for the VAL are defined. On the basis of the threshold values, the domain D2 is divided into a low output area L2, a basic output area N2, and a high output area H2 (the method of setting the respective areas is the same as above).

A laser brightness determination unit 406 shown in FIG. 7 calculates LASER_GAIN, which is a laser brightness coefficient (Step 105). As shown in FIG. 12, on a predetermined position in the domain D2, a point P is set, and a gain value is stored for each point P. That is, in this embodiment, the gain value is stored corresponding to a predetermined set of APL and VAL.

The point P sections the domain D2 with a plurality of threshold values for the APL and VAL in a checkered manner, and each point P is set at an intersection of the checker. The plurality of threshold values includes the threshold value a2, the threshold value m2, and the threshold value v2, and other threshold values may be set as appropriate.

In this embodiment, in the high output area H2, high output point PH (gain value higher than 2000 lm) for increasing the output is set. Further, on a position surrounding the basic output area N2, a basic output point PN (gain value of 2000 lm) is set. Further, on a lower left of the low output area L2, low output point PL (gain value lower than 2000 lm) for reducing the output to approximately origin of the domain D2 is set.

Figure 13:
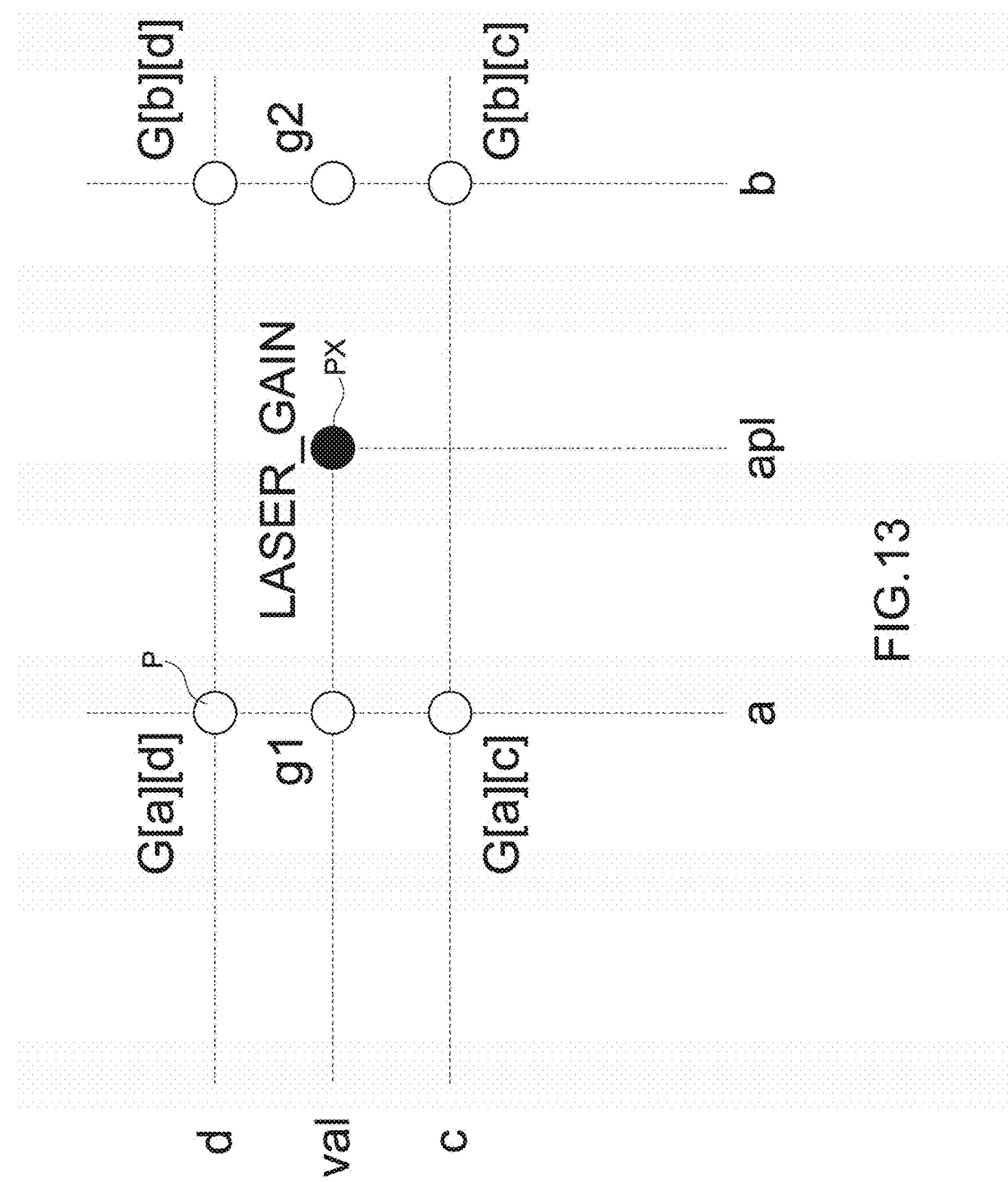
FIG. 13 A schematic diagram for explaining a calculation method of LASER_GAIN.

FIG. 13 is a schematic diagram for explaining a method of calculating LASER_GAIN. First, from an image signal to be input, the APL and VAL are calculated. Four points P around a calculation point PX on the domain D2 which corresponds to an obtained calculation result are selected. When a set of APL and VAL is described as (APL, VAL), in the example shown in FIG. 13, four points P of (a, d), (a, c), (b, d), and (b, c) are selected. It should be noted that the APL and VAL of the calculation point PX is described as (apl, val).

Gain values stored so as to correspond to the points P are set as G[a][d], G[a][c], G[b][d], and G[b][c], respectively. By using the gain values, from the following expression, LASER_GAIN is calculated.

$$g1=(G[a][d]-G[a][c])/(d-c)*(val-c)+G[a][c]$$

$$g2=(G[b][d]-G[b][c])/(d-c)*(val-c)+G[b][c]$$

$$LASER\_GAIN=(g2-g1)/(b-a)*(apl-a)+g1 \quad \text{[Mathematical 6]}$$

First, a gain value of a point g1 as (a, val) and a gain value of a point g2 as (b, val) are calculated. From those values, a gain value of the calculation point PX is calculated. That is, in accordance with an inclination (distance) from the calculation point PX to the four points P, LASER_GAIN is calculated. As a result, LASER_GAIN can be easily calculated.

It should be noted that in a case where the gain values stored in the four points P therearound are equal to one another, for example, are the high output point PH or the like, the calculation described above may be omitted, and the stored gain value may be set as it is.

On the other hand, with respect to the high output point PH, a different gain value may be stored. For example, in the high output area H2, for the high output point PH close to the origin, a relatively small gain value is set within a range higher than the basic output. Further, as the high output point PH is distanced from the origin, the gain value is set to be higher. As a result, image displaying that enables expression of brightness of a scene with higher accuracy is achieved. In this case, it is also possible to easily calculate LASER_GAIN by using the calculation described above.

Figure 14:
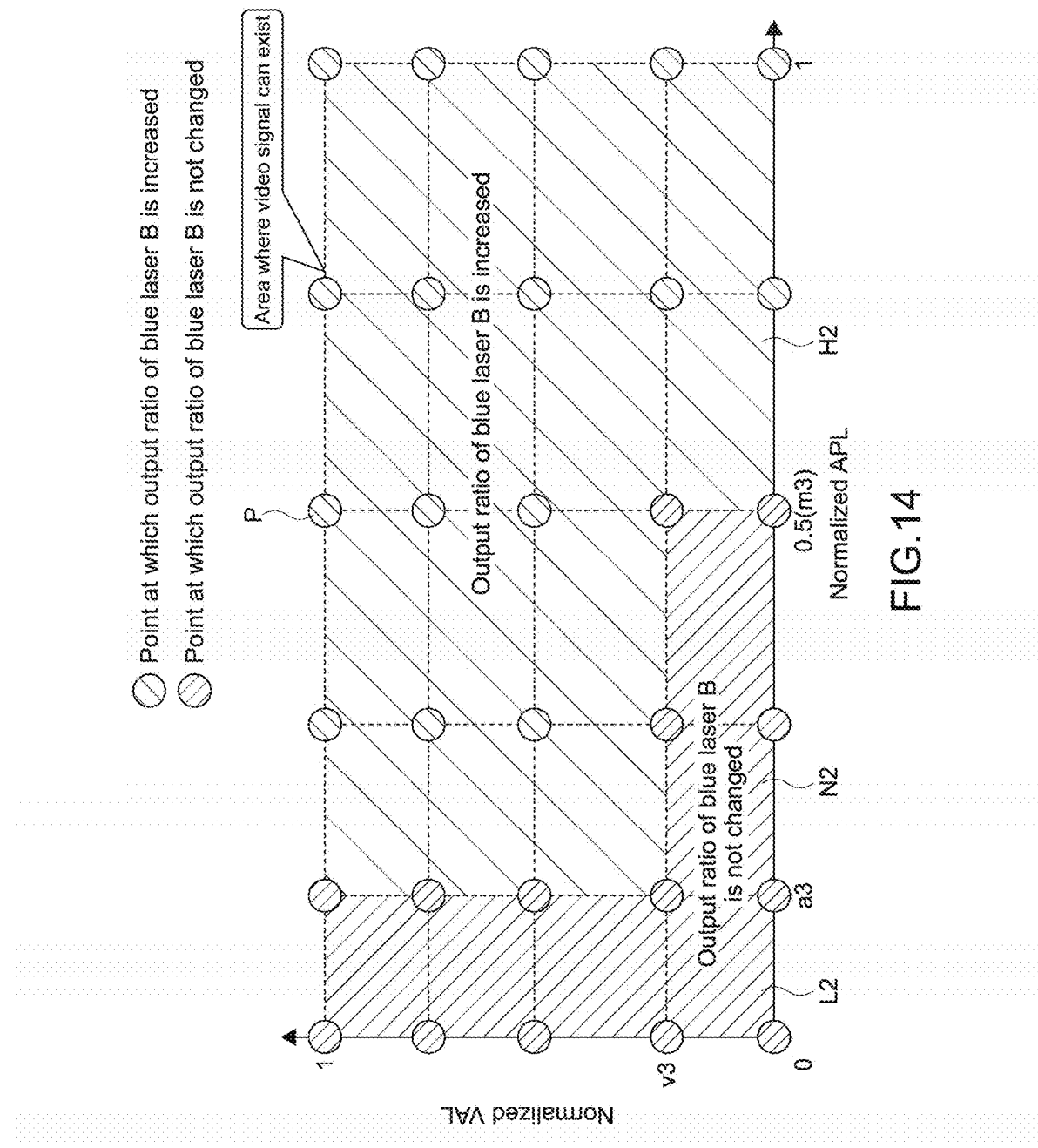
FIG. 14 A graph showing a point set to calculate LASER_WB_RATIO.

A laser output ratio determination unit 407 shown in FIG. 7 calculates LASER_WB_RATIO, which is a laser output ratio coefficient (Step 106). As shown in FIG. 14, in this embodiment, for each predetermined point P, an output ratio is stored. The point P is typically the same point as the point P shown in FIG. 13. Of course, a point for calculating LASER_WB_RATIO may be set again.

The laser output ratio determination unit 407 obtains the number of pixels of the cool color from the hue histogram, and calculates a rate of the number of pixels of the cool color to a total number of pixels. In a case where a result of the calculation is larger than a predetermined threshold value (third threshold value), it is determined that the image is a bluish scene image to calculate LASER_WB_RATIO. In a case where the rate of the number of pixels of the cool color is smaller than the threshold value, control for the output ratio of the blue laser lights B and BE is not performed, and a basic output ratio is set.

LASER_WB_RATIO can be calculated by the method described with reference to FIG. 13 on the basis of the output ratio stored in the points P shown in FIG. 14. That is, the four points P around the calculation point PX are selected, and on the basis of a distance to each point P, LASER_WB_RATIO is calculated from the calculation expression.

For the determination of the bluish scene image, instead of the number of pixels with the cool color, the number of pixels with the warm color and the number of pixels with the achromatic color may be used. For example, in a case where a rate of the number of pixels with the warm color with respect to a total number of pixels is smaller than a predetermined threshold value (fourth threshold value), and a rate of the number of pixels with respect to the achromatic color with respect to the total number of pixels is smaller than a predetermined threshold value (fifth threshold value), LASER_WB_RATIO may be calculated. That is, on a basis of at least one of the number of pixels with the cool color and the number of pixels with the warm color, it is possible to determine whether the image is the bluish scene image or not.

It should be noted that in the example shown in FIG. 14, in a case where the calculation point PX is included in a high output area H3, the output ratio of the blue laser lights B and BE is changed. On the other hand, in a case where the calculation point PX is included in the low output area L3 and a basic output area N3, the output ratio is not changed. This is a setting by finding that a very vivid image is displayed in a case where the output of the blue laser light B is increased with respect to a bright scene image. Of course, in a case where the calculation point PX is included in a low output area L3 and the basic output area N3, the output of the blue laser light B may be increased.

A laser output value determination unit 408 calculates an actual laser output set value (for example, current value or the like) on a basis of LASER_GAIN and LASER_WB_RATIO (Step 107). An assumption is made that an output set value of the laser light sources 17 of the B light source module 10 is LASER_OUT_B, and an output set value of the laser light sources 61 of the GR light source module 50 is LASER_OUT_GR. The output set values are calculated from the following expression.

LASER_OUT_*RG*=LASER_GAIN

LASER_OUT_*B*=LASER_GAIN* LASER_*WB*_RATIO     [Mathematical 7]

LASER_OUT_B and LASER_OUT_GR are set for laser drivers 151 and 152 connected to the respective light source modules (Step 108). It should be noted that in a case of exceeding a maximum value at which LASER_OUT_B can be set, the output of the laser light sources 61 of the GR light source module 50 is relatively reduced. For example, LASER_GAIN is multiplied by a reciprocal of LASER_WB_RATIO, and a value thus obtained is set as LASER_OUT_GR.

As described above, in the image display apparatus 500 according to this embodiment, on a basis of the average and dispersion of the luminance values calculated from the image information, the outputs of the blue laser lights B and BE are controlled. Further, by the hue histogram calculated from the image information, the output ratio of the blue laser lights B and BE is controlled. As a result, it is possible to generate and display a high-quality image.

Other Embodiments

The present technology is not limited to the embodiments described above, and other various embodiments can be achieved.

In the above description, by using the weighting coefficient WT[x], the APL and VAL are calculated. As a result, the calculation amount can be suppressed, and a reduction of a processing time can be achieved. On the other hand, as shown in the following expression, the luminance values of all the pixels are used as they are, and thus the APL and VAL may be calculated. It should be noted that Y in the expression represents the luminance value, and P represents the total number of pixels.

$$APL = \frac{1}{P}\Sigma Y$$

$$VAL = \frac{1}{P}\Sigma (APL - Y)^2$$     [Mathematical 8]

The APL and VAL may be obtained by other calculations.

Figure 15:
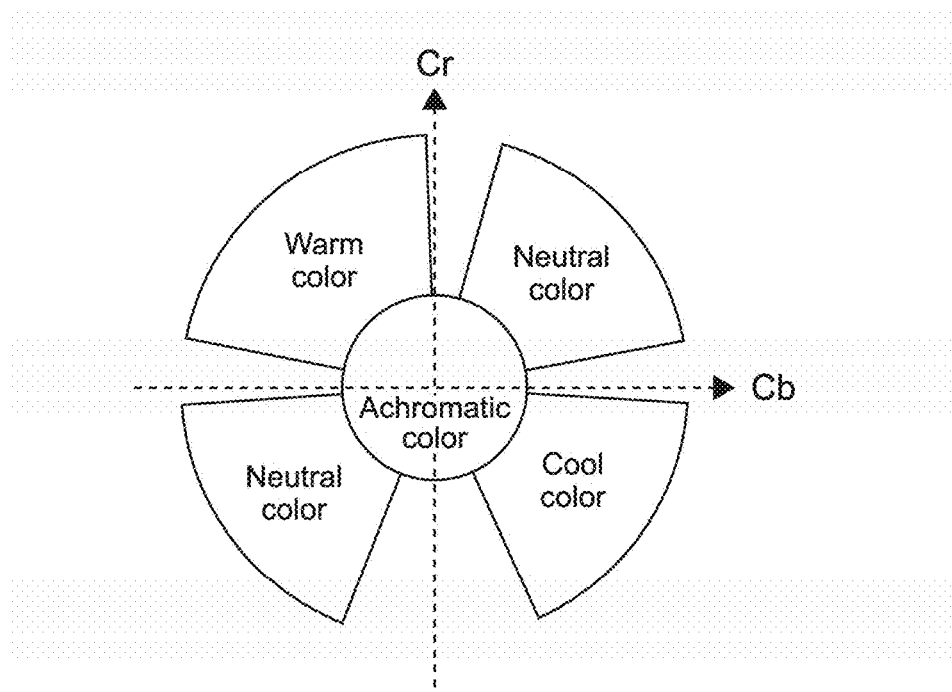
FIG. 15 A schematic diagram showing another example of a hue histogram.

FIG. 15 is a schematic diagram showing another example of the hue histogram. As shown in FIG. 15, on a basis of values of Cb and Cr calculated from the RGB value, a hue histogram may be generated on a basis of the number of pixels included in an area of each hue, determination of a bluish scene image is performed. By other methods, the hue histogram may be generated.

In the image display apparatus 500 shown in FIG. 1, in the light source apparatus 100, the blue laser light B and the yellow light GR are synthesized, white light W, which is synthesis light thereof is emitted along the optical axis L1. Instead, from the light source apparatus 100, the blue laser light B and the yellow light GR may be emitted separately from each other. In this case, in the image generation system 200, an optical system for guiding the blue laser light B to the liquid crystal light valve 201B is configured. Further, an optical system for separating the yellow light GR into red light R and green light G and guiding the lights to the liquid crystal light valves 201R and G, respectively, is configured. To an image display apparatus having the above configuration, the present technology can also be applied.

In the above description, the output control based on the average and dispersion of the luminance values and the control for the output ratio based on the hue histogram are performed. The control is not limited thereto, and only one control may be performed for the outputs of the blue laser lights B and BE.

On a basis of the average and dispersion of the luminance values, the output ratio of the blue laser lights B and BE may be controlled. For example, with respect to a very bright image, control may be performed in such a manner that the output of the blue laser light B is relatively stronger. Further, on the basis of the hue histogram, the outputs of the blue laser lights B and BE may be increased or decreased. In such a process, a high-quality image can be displayed.

In the above description, the B light source module 10 and the GR light source module 50 are provided so as to be controllable independently of each other. Further, attention is focused on the blue component of the image (cool color component), and the output ratio of the two emitted lights is controlled. The color of light, emission of which can be independently controlled and the color component of an image to which attention is focused are not limited to blue, and the present technology may be applied to another color.

Out of the characteristic parts according to the present technology described above, at least two characteristic parts may be combined. That is, various characteristic parts described in the above embodiments may be arbitrarily combined irrespective of the embodiments. Further, the various effects described above are merely examples and are not limited, and other effects may be exerted.

It should be noted that the present technology can take the following configurations.

(1) An image display apparatus, including:
    a first light source module that emits a first laser light;
    a second light source module including a light source unit that emits a second laser light and a phosphor layer that is excited by the second laser light to emit visible light;

an output control unit that controls outputs of the first laser light and the second laser light on a basis of an average and a dispersion of luminance values in pixels of an input image; and an image generation unit that generates an image on a basis of the first laser light emitted from the first light source module and the visible light emitted from the second light source module.

(2) The image display apparatus according to (1), in which the output control unit increases the outputs of the first laser light and the second laser light in a case where the average of the luminance values is larger than a first threshold value, and the dispersion of the luminance values is larger than a predetermined dispersion value.

(3) The image display apparatus according to (2), in which the output control unit increases the outputs of the first laser light and the second laser light irrespective of a degree of the dispersion of the luminance values in a case where the average of the luminance values is larger than a second threshold value larger than the first threshold value.

(4) The image display apparatus according to (3), in which the second threshold value is the average of the luminance values at a time when the dispersion of the luminance values is a maximum.

(5) The image display apparatus according to any one of (1) to (4), in which
the output control unit controls a ratio of the outputs of the first laser light and the second laser light.

(6) The image display apparatus according to any one of (1) to (5), in which
the output control unit performs normalization for a domain range of the dispersion of the luminance values with respect to the average of the luminance values, and controls the outputs on a basis of the average and the dispersion after the normalization.

(7) The image display apparatus according to any one of (1) to (6), in which
the first laser light has a wavelength range including a first color,
the visible light has a wavelength range including a second color different from the first color, and
the output control unit calculates hues of the pixels on a basis of the input image, and controls a ratio of the outputs of the first laser light and the second laser light on a basis of the calculated hues of the pixels.

(8) The image display apparatus according to (7), in which
the first color is blue,
the second color is yellow, and
the output control unit classifies the pixels of the input image on a basis of the hues, and controls the ratio of the outputs on a basis of at least one of a number of pixels classified into a hue of a cool color and a number of pixels classified into a hue of a warm color.

(9) The image display apparatus according to (8), in which
the output control unit increases the ratio of the first laser light in a case where a rate of the number of pixels classified into the hue of the cool color with respect to a total number of pixels is more than a third threshold value.

(10) The image display apparatus according to (8), in which
the output control unit increases the ratio of the first laser light in a case where a rate of the number of pixels classified into the hue of the warm color with respect to a total number of pixels is less than a fourth threshold value, and a rate of a number of pixels classified into a hue of an achromatic color with respect to the total number of pixels is less than a fifth threshold value.

REFERENCE SIGNS LIST

B blue laser light
BE blue laser light
GR yellow light
10 B light source module
17, 61 laser light source
50 GR light source module
56 phosphor wheel
62 phosphor layer
100 light source apparatus
200 image generation system
300 projection system
400 control unit (output control unit)
402 Y histogram detection unit
403 HSV conversion unit
404 hue histogram detection unit
405 APL/dispersion calculation unit
406 laser brightness determination unit
407 laser output ratio determination unit
408 laser output value determination unit
500 image display apparatus

The invention claimed is:

1. An image display apparatus, comprising:
a first light source module configured to emit a first laser light;
a second light source module that includes:
a light source unit configured to emit a second laser light; and
a phosphor layer configured to emit visible light based on excitation of the phosphor layer by the second laser light;
an output control unit configured to increase an output of the first laser light and an output of the second laser light based on an average of luminance values of pixels of an input image and a dispersion of the luminance values of the pixels of the input image, wherein
the average of the luminance values of the pixels is larger than a first threshold value, and
the dispersion of the luminance values of the pixels is larger than a determined dispersion value; and
an image generation unit configured to generate an image based on the first laser light and the visible light.

2. The image display apparatus according to claim 1, wherein
the output control unit is further configured to increase the output of the first laser light and the output of the second laser light irrespective of a degree of the dispersion of the luminance values, based on the average of the luminance values that is larger than a second threshold value, and
the second threshold value is larger than the first threshold value.

3. The image display apparatus according to claim 2, wherein the second threshold value is the average of the luminance values in a case where the dispersion of the luminance values is maximum.

4. The image display apparatus according to claim 1, wherein the output control unit is further configured to control a ratio of the output of the first laser light and the output of the second laser light.

5. The image display apparatus according to claim 1, wherein the output control unit is further configured to:
normalize a domain range of the dispersion of the luminance values with respect to the average of the luminance values; and control the output of the first laser light and the output of the second laser light based on the normalization.

6. The image display apparatus according to claim 1, wherein
the first laser light has a first wavelength range corresponding to a first color,
the visible light has a second wavelength range corresponding to a second color different from the first color, and
the output control unit is further configured to:
calculate hues of the pixels of the input image; and
control a ratio of the output of the first laser light and the output of the second laser light based on the calculated hues of the pixels.

7. The image display apparatus according to claim 6, wherein
the first color corresponds to blue color,
the second color corresponds to yellow color, and
the output control unit is further configured to:
classify a first number of pixels of the pixels of the input image into a hue of a cool color based on the calculated hues;
classify a second number of pixels of the pixels into a hue of a warm color based on the calculated hues; and
control the ratio of the output of the first laser light and the output of the second laser light based on at least one of the classification of the first number of pixels or the classification of the second number of pixels.

8. The image display apparatus according to claim 7, wherein
the output control unit is further configured to increase the ratio based on a rate of the first number of pixels classified into the hue of the cool color with respect to a total number of pixels, and
the rate of the first number of pixels is more than a third threshold value.

9. The image display apparatus according to claim 7, wherein
the output control unit is further configured to increase the ratio based on:
a rate of the second number of pixels classified into the hue of the warm color with respect to a total number of pixels, and
a rate of a third number of pixels classified into a hue of an achromatic color with respect to the total number of pixels,
the rate of the second number of pixels is less than a fourth threshold value, and the rate of the third number of pixels is less than a fifth threshold value.

10. An image display method, comprising:
calculating luminance values of pixels based on image information;
increasing, based on an average of the calculated luminance values of the pixels and a dispersion of the calculated luminance values of the pixels, an output of a first laser light emitted from a first light source module and an output of a second laser light emitted by a second light source module, wherein
the second laser light corresponds to excitation light that excites a phosphor layer of the second light source module,
the average of the calculated luminance values of the pixels is larger than a threshold value, and
the dispersion of the calculated luminance values of the pixels is larger than a determined dispersion value; and
generating an image based on the first laser light and visible light emitted from the phosphor layer,
wherein the phosphor layer emits the visible light based on the excitation of the phosphor layer.

11. A non-transitory computer-readable medium having stored thereon computer-executable instructions that, when executed by an image display apparatus, cause the image display apparatus to execute operations, the operations comprising:
calculating luminance values of pixels based on image information;
increasing, based on an average of the calculated luminance values of the pixels and a dispersion of the calculated luminance values of the pixels, an output of a first laser light emitted from a first light source module and an output of a second laser light emitted by a second light source module, wherein
the second laser light corresponds to excitation light that excites a phosphor layer of the second light source module,
the average of the calculated luminance values of the pixels is larger than a threshold value, and
the dispersion of the calculated luminance values of the pixels is larger than a determined dispersion value; and
generating an image based on the first laser light and visible light emitted from the phosphor layer,
wherein the phosphor layer emits the visible light based on the excitation of the phosphor layer.

12. An image display apparatus, comprising:
a first light source module configured to emit a first laser light having a first wavelength range corresponding to a first color;
a second light source module that includes:
a light source unit configured to emit a second laser light; and
a phosphor layer configured to emit visible light based on excitation of the phosphor layer by the second laser light,
wherein the visible light has a second wavelength range that corresponds to a second color different from the first color;
an output control unit configured to increase an output of the first laser light and an output of the second laser light, based on hues in pixels of an input image, an average of luminance values of the pixels, and a dispersion of the luminance values of the pixels, wherein
the average of the luminance values of the pixels is larger than a threshold value, and
the dispersion of the luminance values of the pixels is larger than a determined dispersion value; and
an image generation unit configured to generate an image based on the first laser light and the visible light.

13. An image display method, comprising:
calculating hues of pixels based on image information;
increasing an output of a first laser light emitted from a first light source module and an output of a second laser light emitted by a second light source module, wherein
the increase in the output of the first laser light and the output of the second laser light is based on the calculated hues of the pixels, an average of luminance values of the pixels, and a dispersion of the luminance values of the pixels,
the second laser light corresponds to excitation light that excites a phosphor layer of the second light source module, the average of the luminance values of the pixels is larger than a threshold value, and the dispersion of the luminance values of the pixels is larger than a determined dispersion value; and generating an image based on the first laser light and visible light emitted from the phosphor layer, wherein the phosphor layer emits the visible light based on the excitation of the phosphor layer.

14. A non-transitory computer-readable medium having stored thereon computer-executable instructions that, when executed by an image display apparatus, cause the image display apparatus to execute operations, the operations comprising:

calculating hues of pixels based on image information;

increasing an output of a first laser light emitted from a first light source module and an output of a second laser light emitted by a second light source module, wherein the increase in the output of the first laser light and the output of the second laser light is based on the calculated hues of the pixels, an average of luminance values of the pixels, and a dispersion of the luminance values of the pixels, the second laser light corresponds to excitation light that excites a phosphor layer of the second light source module, the average of the luminance values of the pixels is larger than a threshold value, and the dispersion of the luminance values of the pixels is larger than a determined dispersion value; and generating an image based on the first laser light and visible light emitted from the phosphor layer;

wherein the phosphor layer emits the visible light based on the excitation of the phosphor layer.

15. An image display apparatus, comprising:

a first light source module configured to emit a first laser light;

a second light source module that includes:
   a light source unit configured to emit a second laser light; and
   a phosphor layer configured to emit visible light based on excitation of the phosphor layer by the second laser light;

an output control unit configured to:
   normalize a domain range of a dispersion of luminance values of pixels of an input image with respect to an average of the luminance values of the pixels of the input image; and
   control an output of the first laser light and an output of the second laser light based on the average of the luminance values and the normalization of the domain range of the dispersion of the luminance values; and an image generation unit configured to generate an image based on the first laser light and the visible light.

* * * * *